Patented Jan. 20, 1948

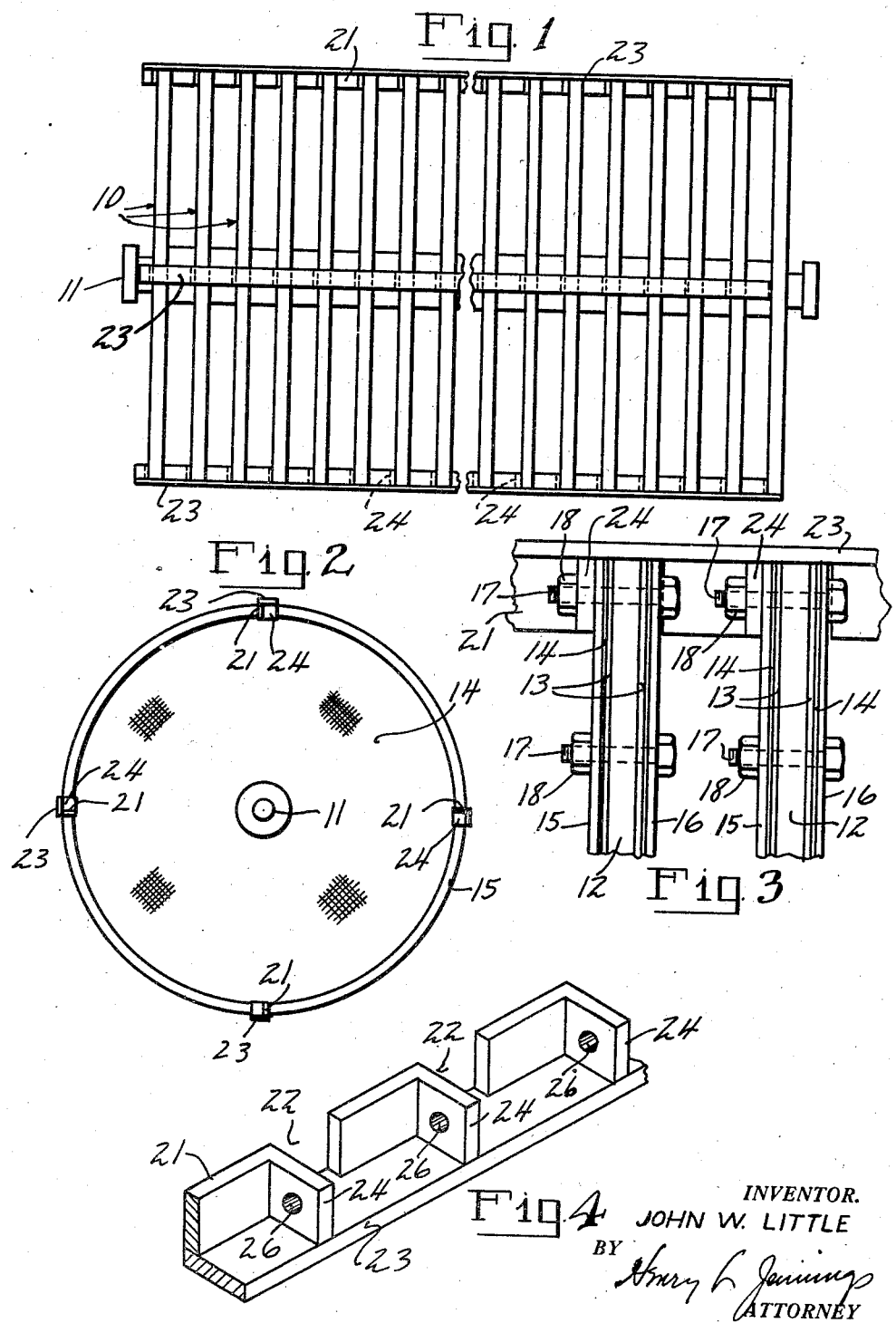

2,434,807

UNITED STATES PATENT OFFICE 2,434,807

FILTER LEAF SUPPORT

John W. Little, Birmingham, Ala., assignor to Goslin-Birmingham Manufacturing Company, Inc., a corporation of Alabama Application June 12, 1946, Serial No. 676,158

5 Claims. (Cl. 210—181)

This invention relates to a filter of the rotating leaf, pressure type, in which a multiplicity of leaves are mounted in spaced relation on a hollow shaft through which the filtrate flows and has for its principal object the provision of improved means for securing and holding the leaves in uniform spaced relation.

In filters to which my invention is particularly applicable the leaves are each made up of a pair of perforated plates, covered with filter cloth, separated by a coarse backing screen, and with a solid inner mounting ring around the periphery. Clamping rings bear against the sides of each leaf at its periphery and clamping bolts extend through the assembled clamping rings, filter cloth and inner mounting rings to hold them in assembled relation. Heretofore, it has been the practice to hold the leaves in spaced relation by means of an angle bar which had one flange notched to fit over the leaves, and with screws passing through the other flange into holes in the peripheral mounting rings.

Difficulties have been encountered with such fastenings due to the working loose of the screws. Also, there is a tendency for the leaves to warp in service and when remounting the leaves after renewing the filter cloth, difficulties are encountered in drawing the leaves to position for entering the screws. It is accordingly the specific object of my invention to provide a spacer bar for the leaves of such a filter which shall be simple, easy to apply, even with the slightly warped leaves, and which shall be held in place by means of the clamping bolts employed in assembling the leaves, thereby obviating the necessity for screws and tapped holes in the peripheral mounting ring.

Apparatus embodying features of my invention is illustrated in the accompanying drawing, forming a part of this application, in which Fig. 1 is a side view of a rotary leaf assembly according to my invention;

Fig. 2 is an end view thereof;

Fig. 3 is a detail view showing my improved spacer bar and its connection to the filter leaf; and Fig. 4 is a detail perspective view of the spacer bar inverted to show the under sides thereof.

Referring to the drawing for a better understanding of my invention, I show in Fig. 1 a rotary leaf assembly comprising a multiplicity of leaves 10 mounted upon a hollow shaft 11. Each of the leaves 10, as is well known, includes an inner mounting ring 12, perforated metal plates 13, on opposite sides of the ring 12, filter cloths 14 superimposed on the metal plates 13 and clamping rings 15 and 16 which bear against the filter cloths. Bolts 17 with nuts 18 thereon extend through the clamping rings, the filter cloth, the perforated plate, and the inner mounting ring 12 to hold them in assembled relation. The leaves 10 are held in properly spaced relation to each other at their peripheries by means of my improved spacer bar, a plurality of which are disposed about the periphery of the leaf assembly, as shown in Fig. 2.

In its preferred embodiment, my improved spacer unit comprises a flat bar 23 to which are welded at regular intervals on the face thereof a plurality of angular lugs embodying flanges 21 and 24, the flanges 21 of which form between them a series of notches 22 in which fit the leaves 10. The flanges 21 of each angular lug extend inwardly between the leaves 10 and serve as paddles to stir up the slurry in the filter as the assembly is rotated in the filtering operation, while as shown, the bar 23 lies flat on the outer peripheries of the leaves 10. At uniformly spaced intervals along the bar, the flanges 24 of the angular lugs are bent inwardly to lie alongside the leaves. Each of the flanges 24 is provided with a bolt hole 26 through which one of the clamping bolts 17 passes and by means of which each leaf, at its outer periphery, is drawn snugly against the flange and held in properly spaced relation with respect to adjacent leaves.

From the foregoing description, it will be seen that my improved spacer bar may be formed from a flat bar to which are secured the angular lugs forming between them the notches 22, the lugs being secured to the bar 23 by welding or brazing along both of its flanges 21 and 24.

While I have described my spacer unit in its preferred form, it may also be formed by notching out the sides of an angle and welding a separate piece thereto to form the equivalent of flange 24. Or, it may be formed by using a die to sever a section of one flange of the angle, and bend the same inwardly, thus forming the notch 22 and flange 24 in one operation and from the same piece of material.

While I have shown my invention in but one form, it will be obvious to those skilled in the art that it is not so limited, but is susceptible of various changes and modifications, without departing from the spirit thereof, and I desire, therefore, that only such limitations shall be placed thereupon as are specifically set forth in the appended claims.

What I claim is:

1. In a filter embodying a multiplicity of leaves mounted on a rotary shaft in spaced relation and in which filter cloth is held in place on opposite sides of each leaf by means of clamping rings and bolts extending from side to side of the leaf, a spacer bar having lugs thereon for engaging the sides of the leaves, and clamping bolts for securing the lugs to the sides of the leaves.

2. In a filter embodying a multiplicity of leaves mounted on a rotary shaft in spaced relation and in which filter cloth is held in place on opposite sides of each leaf by means of clamping rings and bolts extending from side to side of the leaf, an axially extending bar for holding the leaves in uniformly spaced relation, said bar having a flange with notches therein fitting over the leaves, the unnotched portions of the flanges extending inwardly between the leaves, a flange lying flat against the outer peripheries of the leaves, spaced lugs on the bars extending inwardly alongside the clamping rings, and clamping bolts extending through the lugs and clamping rings to secure the leaves to the spacer bar.

3. Apparatus as set forth in claim 2 in which a plurality of said spacer bars engage the leaves at intervals around the periphery.

4. In a filter embodying a multiplicity of leaves mounted on a rotary shaft in spaced relation and in which filter cloth is held in place on opposite sides of each leaf by means of clamping rings and bolts extending from side to side of the leaf, an axially extending flat bar lying against the outer peripheries of the leaves, a plurality of angular lugs secured in spaced relation along the inner face of said bar with one flange thereof parallel to the bar and the other extending inwardly alongside the clamping rings, and clamping bolts extending through said rings and the inwardly extending flange to secure the rings to said flat bar.

5. Apparatus as set forth in claim 4 in which both flanges of the angular lugs are welded to the inner face of the axially extending bar.

JOHN W. LITTLE.